United States Patent
Wilson et al.

(10) Patent No.: US 9,507,654 B2
(45) Date of Patent: Nov. 29, 2016

(54) DATA PROCESSING SYSTEM HAVING MESSAGING

(71) Applicant: FREESCALE SEMICONDUCTOR, INC., Austin, TX (US)

(72) Inventors: Peter J. Wilson, Leander, TX (US); Brian C. Kahne, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/694,601

(22) Filed: Apr. 23, 2015

(65) Prior Publication Data

US 2016/0314030 A1    Oct. 27, 2016

(51) Int. Cl.
*G06F 13/00* (2006.01)
*G06F 9/54* (2006.01)

(52) U.S. Cl.
CPC ..................... *G06F 9/546* (2013.01)

(58) Field of Classification Search
CPC ... G06F 3/30043; G06F 9/3851; G06F 9/546
USPC .......................... 712/220, 225; 719/313, 314
See application file for complete search history.

(56) References Cited

U.S. PATENT DOCUMENTS

| | | | | |
|---|---|---|---|---|
| 6,862,595 B1 * | 3/2005 | Elko | ...................... | G06F 9/546 719/314 |
| 6,999,997 B2 * | 2/2006 | Clarke | .................... | G06F 9/544 709/213 |
| 2003/0110232 A1 * | 6/2003 | Chen | .................. | H04L 67/1002 709/212 |
| 2013/0138930 A1 | 5/2013 | Wilson | | |

OTHER PUBLICATIONS

Prentice Hall, "Transputer Instruction Set", Alternative input, 1988, pp. 45-48.

\* cited by examiner

*Primary Examiner* — Andy Ho (57) ABSTRACT

A processing system includes a first processing system element, and a second processing system element configured to communicate with the first processing system. The second processing system element includes a set of messaging queues. Each of the messaging queues includes one or more entries for storing data, a set of delegate queue addresses associated with one of the set of messaging queues; and a delegate queue associated with the set of messaging queues. The delegate queue includes a set of entries corresponding to the delegate queue addresses, and each of the entries of the delegate queue indicates whether a corresponding one of the set of messaging queues is storing data.

20 Claims, 5 Drawing Sheets

DATA PROCESSING SYSTEM HAVING MESSAGING

BACKGROUND

Field

This disclosure relates generally to data processing system architecture, and more specifically, to data processing systems having messaging.

Related Art

Multiprocessor computer systems have been known for many years, but their architecture, in particular how software running on one processor interacts with software running on another processor have generally made use of expensive and inefficient mechanisms such as shared memory and interprocessor interrupts. Thus facilities for cost-effective and efficient inter-program communication are rare. Further, shared-bus systems limited the maximum number of processors to a dozen or two (for cache-coherent SMPs), although 'clusters' could get much larger at the expense of having the expected cache behavior be managed explicitly by software instead of hardware.

Current VLSI technology is pushing system architectures to embrace an increasingly large number of processing units (or other intelligent agents) on a single chip. This means that increasingly software running on or controlling agents will need to efficiently communicate across processing units and agents. Current practice such as shared memory, interprocessor interrupts, etc., is slow and does not scale well, in addition to often requiring expensive and also difficult to scale cache-coherent shared memory.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods disclosed herein provide inter-processor (and inter-process) communications between processing system elements of a data processing system. In one embodiment, messaging queues are used within processing system elements to receive messages from other processing system elements, from timer circuitry, or from other threads within a processing system element. A delegate queue of the messaging queues corresponds to a subset of the messaging queues and is configured to store one or more notifications of messages which have been received by the subset of the messaging queues. In this manner, processors or threads within the data processing system may be awakened when it is known that a message is available in at least one of the subset of messaging queues.

Figure 1:
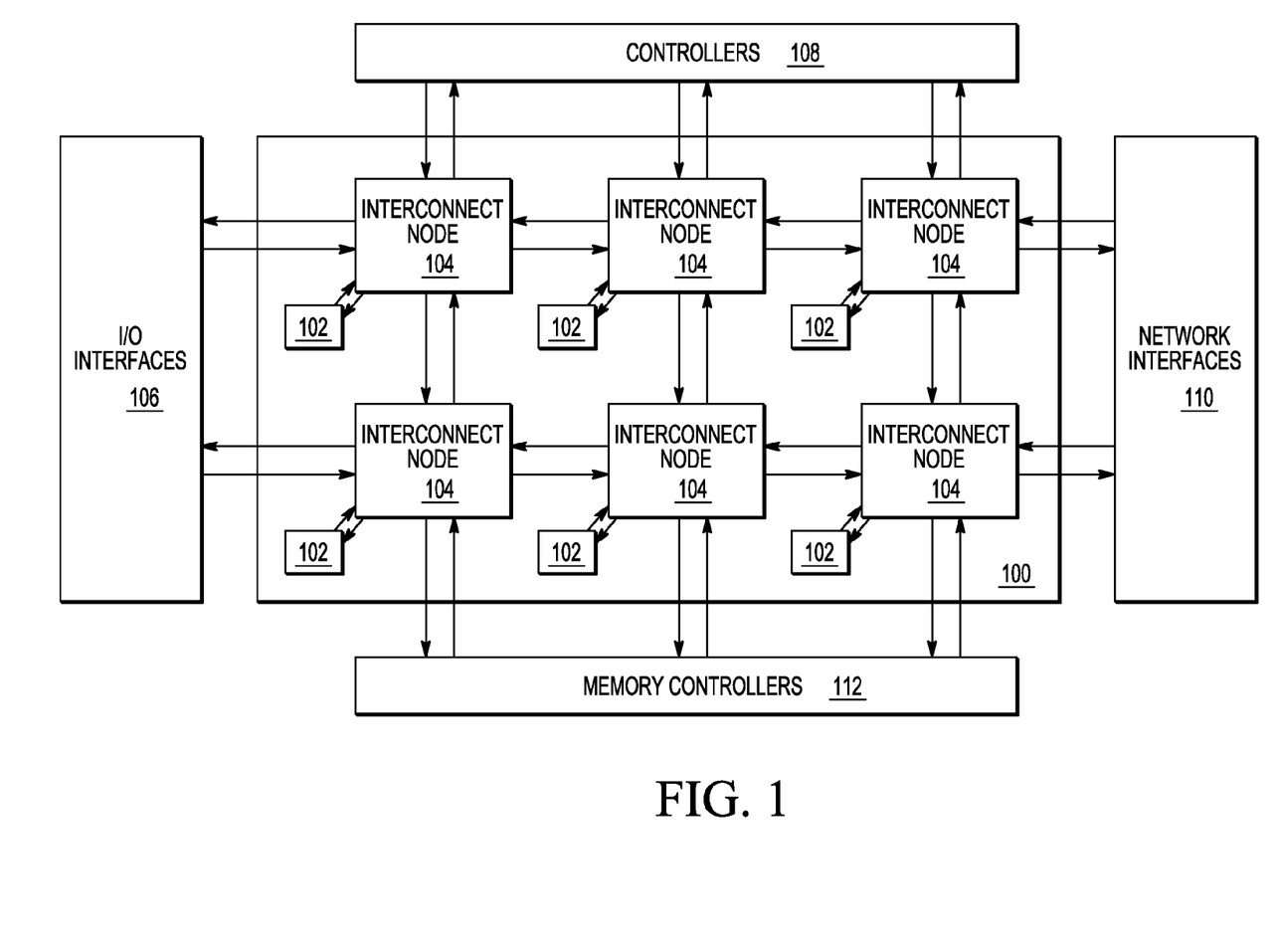
FIG. 1 illustrates, in block diagram form, a data processing system having multiple processing system elements in accordance with an embodiment of the present invention.

FIG. 1 illustrates a data processing system 10 having multiple processing system elements 102 in accordance with one embodiment of the present invention. A processing system element 102 may be any type of processing element, such as, for example, a processor core, a memory controller, a direct memory access (DMA) engine, or the like. When a processing system element 102 is to be used in a system 100 of many interconnected processing system elements 102, a system interconnect other than a bus can be used. Often a mesh of interconnects is appropriate. Such a mesh 100 of interconnect nodes 104 is shown in FIG. 1 depicting an array of interconnect nodes 104 connected to other interconnect nodes 104 in respective north, south, east and west directions. In this manner, each interconnected node 104 may be addressed using X, Y coordinates. Interconnect node 104 can be associated with and configured to communicate with a respective processing system element 102. Interconnect nodes 104 can operate concurrently, and thus data transfers may be occurring on all of the interconnect nodes 104 simultaneously. Resources such as memory controllers 108, 112, I/O device interfaces 106, and network interfaces 110 may be configured to communicate with mesh 100.

In alternate embodiments, alternate system interconnects may be used, other than a mesh as illustrated in FIG. 1, to interconnect processing system elements 102. For example, such interconnects include a cross-bar switch, a ring interconnect, a point-to-point mesh fabric, a mesh with diagonal interconnects, a high-order hypercube interconnect, multiple buses with interbus bridges, or the like.

Figure 2:
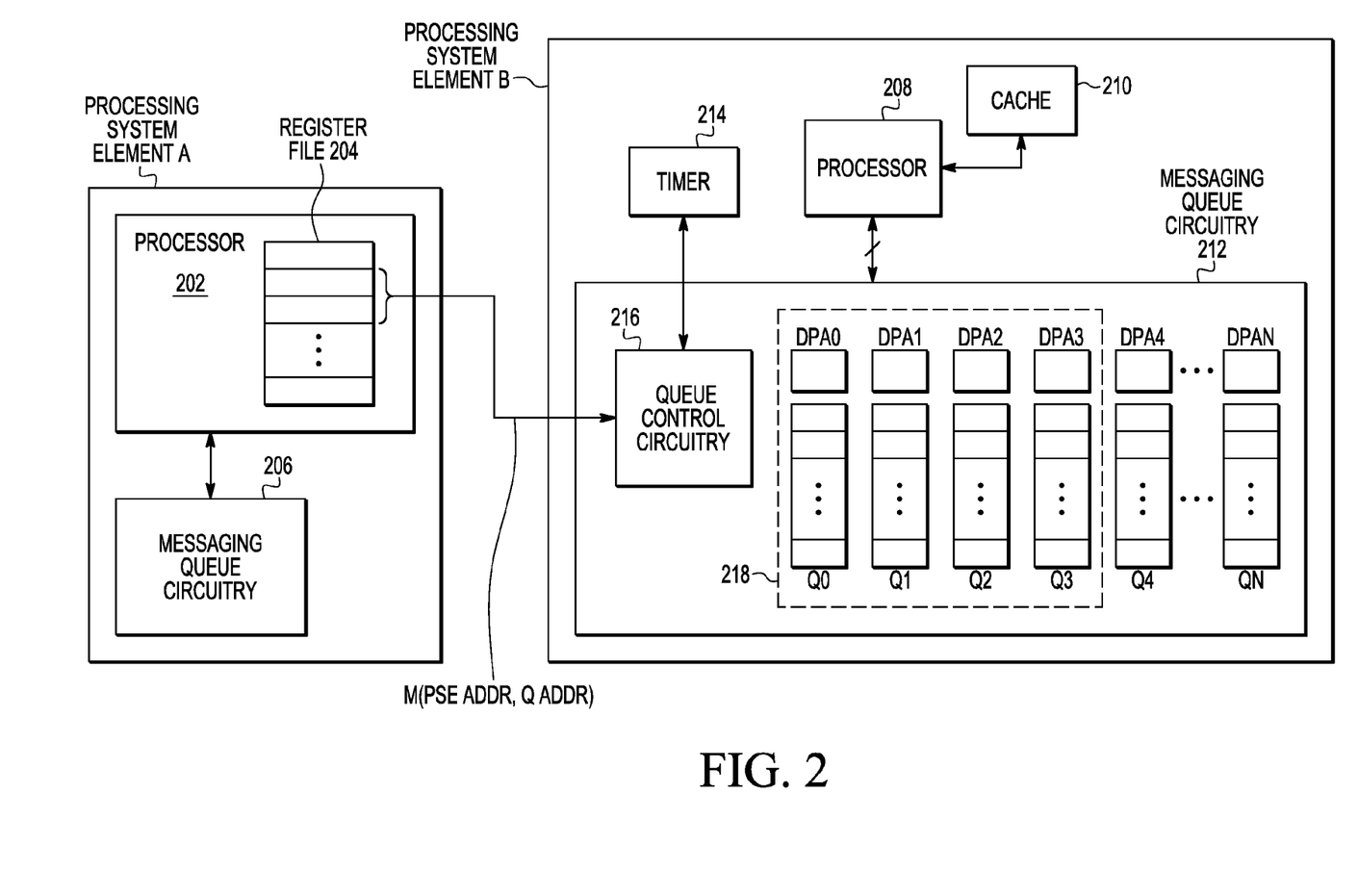
FIG. 2 illustrates in block diagram form, a processing system element A and a processing system element B of the data processing system of FIG. 1 in accordance with one embodiment of the present invention.

FIG. 2 illustrates an example processing system element A of FIG. 1 and an example processing system element B of FIG. 1. Processing system elements A and B can be any two of processing system elements 102 of FIG. 1. Processing system element A includes a processor 202 and messaging queue circuitry 206. Processor 202 includes a register file 204 and is bidirectionally coupled to messaging queue circuitry 206. Although only one register file is illustrated, processor 202 may include any number of register files. Processing system element B includes timer circuitry 214, a processor 208, a cache 210, and message queue circuitry 212. Processor 208 is bidirectionally coupled to cache 210 and messaging queue circuitry 212.

Messaging queue circuitry 212 includes queue control circuitry 216, N+1 message queues Q0-QN, and N+1 delegate queue address indicators DQA0-DQAN. Timer circuitry 214 is bidirectionally coupled to queue control circuitry 216 and queue control circuitry 216 is coupled to processor 202 of processing system element A. Note that messaging queue circuitry 206 of processing system element A may include similar elements as messaging queue circuitry 212 of processing system element B. Also, processing system element A may also include timer circuitry, similar to timer circuitry 214, and a cache coupled to processor 202, similar to cache 210. Similarly, processor 208 includes one or more register files. Cache 210 may be any type of cache memory, and in one embodiment, is a level one cache of processor 208.

In operation, in a system of interconnected system processing elements such as system 10, concurrent software programs need the ability to communicate between processing system elements. Therefore, messages can be communicated between system processing elements 102 of system 10. Each system processing element 102 of system 10 is therefore generally capable of sending and receiving messages using message send and receive instructions. Each system processing element 102 may be a single thread processing element or a multi-threaded processing element, in which any thread of the multi-threaded processing element can send or receive messages.

A thread of a processor can send a message to another processing element by the execution of a send instruction. Upon execution of a send instruction, the processor formulates a message to be sent to a destination processing element. The messages may include any type of information, such as data values, commands, or combinations thereof. The messages to be sent include the contents of one or more registers in the register file of the processor of the sending (i.e. source) system processing element. Each message also includes a processing system element address (PSE ADDR). Messages can move from one interconnect node 104 to another from the source system processing element until the messages reach their destination system processing element 102 as indicated by the PSE ADDR. Known routing protocols may be used to route a message from a processing system element 102 to a destination processing system element 102. For example, in some embodiments, messages can be routed by traversing mesh 100 vertically, then horizontally. Each interconnect node 104 knows its own coordinates in the x*y grid of interconnect nodes 104, and a message arriving can have an address specified by (X, Y) as a coordinate in the grid.

Messages received by a receiving (i.e. destination) system processing element are written into a register file of the receiving system processing element so that the information may be accessed by the processor of that system processing element. However, since a thread of a processing system element needs to receive messages from several sources (which, as will be described below, may include other processing system elements, other threads of the same processing system element, or timer circuitry within the processing system element), messaging queue circuitry is used to store incoming messages which are to be processed and stored into the register file by the processing system element.

In one embodiment, the messaging queue circuitry of a processing system element includes N+1 messaging queues (Q0-QN) which may be used to store incoming messages. In one embodiment, the messaging queues are hardware queues, each having a corresponding queue address, and are controlled by queue control circuitry. Therefore, each message, along with a PSE ADDR, includes a queue address (Q ADDR). The contents of the message includes header information, which may be stored in a first register in the register file of the processor of the sending processing system element. The header information includes an indication as to the contents of how many registers of the register file are included in the message. The contents of the received message can then be stored in the addressed messaging queue in the messaging queue circuitry of the receiving processing system element. In one embodiment, different messaging queues of the messaging queue circuitry are used to store different classes of messages. For example, one queue might accept messages from a particular source while another queue might accept time-out messages (from local timer circuitry). In the receiving processing system element, a message is received by the processor of the receiving processing system element by a thread of the processor executing a receive instruction in which the receive instruction specifies a particular queue of Q0-QN which is to receive the message. Upon execution of a receive instruction (indicating any queue), the thread goes to sleep awaiting an input from one of the messaging queues in the messaging queue circuitry. In one messaging system available today, when one or more messaging queues receives data, the thread is designated as runnable. When the thread resumes execution, it traverses all queues until one storing a message is found. The thread can then process that message and store it into the register file of the processor. However, traversing all queues in the queue messaging circuitry is inefficient. Therefore, as will be described in more detail below, one of the messaging queues of the queue messaging circuitry can be configured as a delegate queue which is configured to store one or more notifications of messages which have been received by other messaging queues. This allows for improved efficiency in communicating messages.

As illustrated in FIG. 2, processing system element A may correspond to a sending processing system element within system 10 for a message M and processing system element B may correspond to a destination processing system element within system 10 for message M. In the illustrated example, message M is addressed to PSE ADDR (which indicates processing system element B) and Q ADDR (which indicates a messaging queue within messaging queue circuitry 212). The contents of the message includes a subset of values from register file 204. The message is received by queue control circuitry 216 which stores the message in the addressed messaging queue.

In processing system element B, messaging queue Q4 is configured as a delegate queue corresponding to a set 218 of the messaging queues Q0-QN. Set 218 includes queues Q0-Q3. Each messaging queue in messaging queue circuitry 212 Q0-QN has a corresponding delegate queue address indicator, DQA0-DQAN. Since Q0-Q3 in set 218 correspond to delegate queue Q4, each of DQA0-DQA3 stores the address of Q4, since Q4 is designated as the delegate queue for set 218. Anytime a message is sent to any of Q0-Q3, queue control circuitry 216 stores a notification of such message into Q4. The notification includes the address of the messaging queue (one of Q0-Q3) which received the message. In this manner, a thread in processor 208, upon executing a receive instruction for the delegate queue Q4, receives indication as to when at least one messaging queue in set 218 has received a message. The thread can then execute a receive instruction for a particular queue of subset 218 based on the notification stored in the delegate queue. Without the use of a delegate queue, a separate non-blocking receive instruction would be needed for each of messaging queues Q0-Q3 to test for the presence of a message and receive a message on the corresponding queue. This polling would have to be done in a loop, resulting in extra energy being consumed. Note that if a message is sent to any other queue outside of subset 218 and Q4, such as to any of queues Q5-QN, no notification for that message will be stored into delegate queue Q4.

Still referring to FIG. 2, queue control circuitry 216 may receive messages for any of the messaging queues Q0-ON from a variety of sources. That is, other processing system elements 102 may send messages to processing system element B to be stored in a messaging queue of messaging queue circuitry 212. Similarly, other threads running on processor 208 may send messages to a thread on processor 208. These messages are also sent to queue control circuitry 216 to be stored in a messaging queue. Also, queue control circuitry 216 may receive messages from timer circuitry 214 within processing system element B. In one embodiment, one particular messaging queue is designated to receive messages from timer circuitry 214. In one example, it is Q3.

In this manner, Q3 and timer circuitry 214 may implement time out events. Time out events may be used to awaken a thread of processor 208 some time period in the future. By designating a particular queue, such as Q3, for time out events, time out events are not queued up in a same queue as input data. This allows the time out events to occur more precisely and not conflict with the input data from other sources in the other queues.

Figure 3:
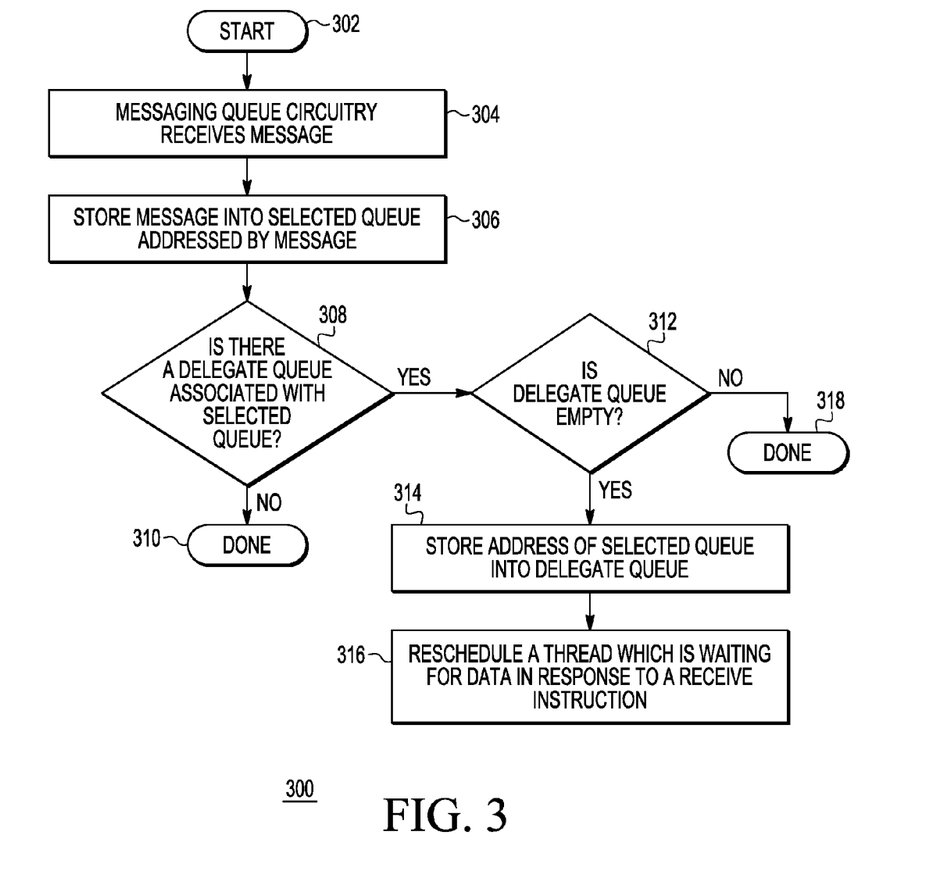
FIGS. 3 and 4 illustrate, in flow diagram form, operations performed by a processing system element of the data processing system of FIG. 1 in accordance with one embodiment of the present invention.

Operation of processing system element B will be described in more detail in reference to FIGS. 3-5. FIG. 3 illustrates a method 300 of storing received messages into messaging queue circuitry, such as messaging queue circuitry 212. Method 300 begins with start 302 and proceeds to block 304 in which the messaging queue circuitry receives a message. Method 300 proceeds to block 306, in which the message is stored into a selected queue within the messaging queue circuitry addressed by the message with Q ADDR. Method 300 proceeds to decision diamond 308 in which it is determined whether there is a delegate queue associated with the selected queue. For example, the corresponding delegate queue address indicator corresponding to the selected queue is checked to see whether a delegate queue is indicated. In the embodiment of FIG. 2, if the selected queue corresponds to any of Q0-Q3, then the corresponding delegate queue address indicator indicates Q4 as the delegate queue for the selected queue. If there is no delegate queue indicated, method 300 ends at done 310.

However, if, at decision diamond 308, a delegate queue is indicated, such as Q4, method 300 proceeds to decision diamond 312 where it is determined if the delegate queue is empty. If it is empty, method 300 proceeds to block 314. In block 314, an indicator of the selected queue is stored into the delegate queue. For example, this indicator may be the address of the selected queue. Referring to the embodiment of FIG. 2, if the selected queue addressed by Q ADDR of the message is Q2, then queue control circuitry 216 stores the received message in Q2 and the address of Q2 in delegate queue Q4. Method 300 proceeds to block 316 in which a thread which is waiting for data in response to an executed receive instruction is rescheduled. That is, once a message has been received, a thread which is waiting for a receive message can be rescheduled since it is known, by the delegate queue not being empty, that there is data available in one of Q0-Q3 to be received by the thread.

If, at decision diamond 312, the delegate queue associated with the selected queue is not empty, i.e. data is present in the delegate queue, no additional notification is stored in the delegate queue and the method ends at done 318. That is, since the delegate queue is not empty, it already stores one notification from a previously received message. This notification is enough to allow a thread which executes a receive instruction for the delegate queue to know that a message has been received at at least one of the messaging queues corresponding to the delegate queue. This will be further discussed in reference to FIGS. 4 and 5 below. Furthermore, in this embodiment, the delegate queue may be a storage location which is configured to store only one entry (one notification or one queue address). However, in an alternate embodiment, an additional notification may be stored in the delegate queue each time a message is received and there is a delegate queue associated with the selected queue, even if the delegate queue is not empty.

Figure 4:
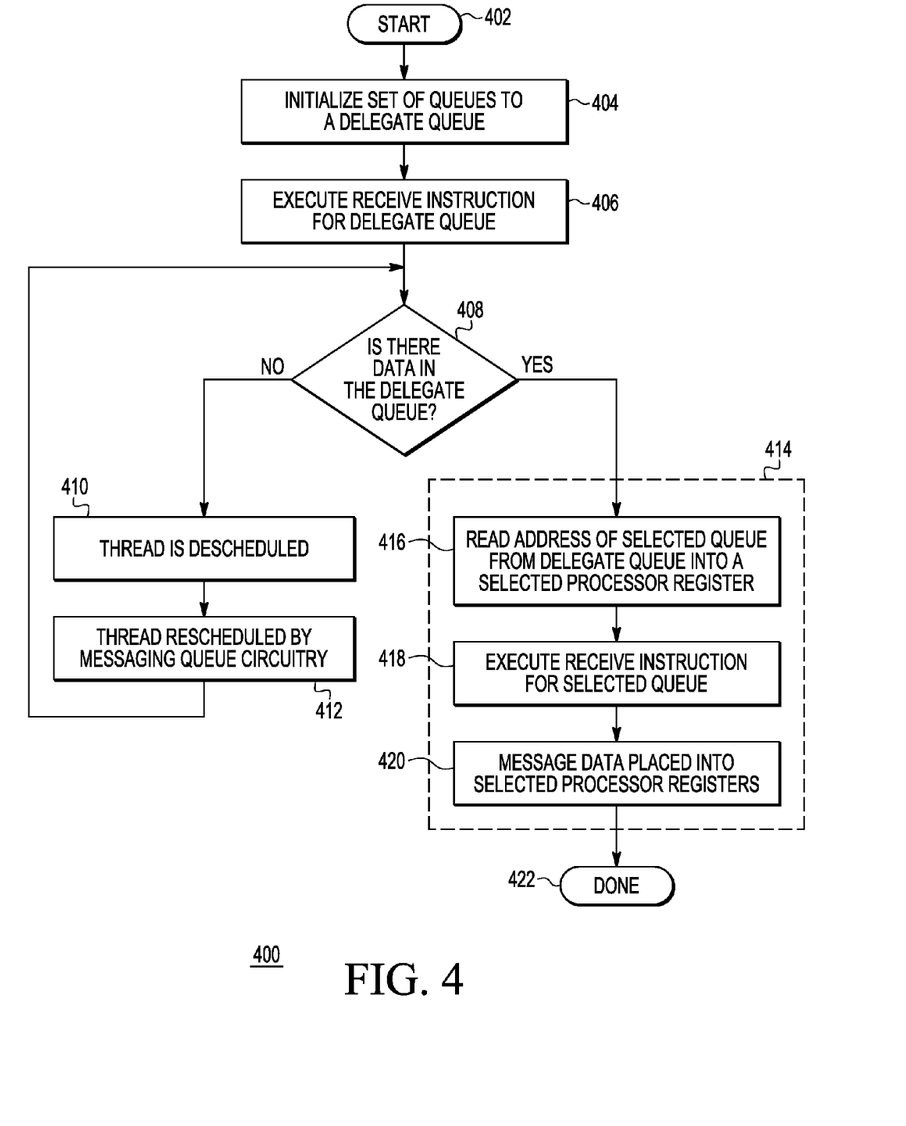
Figure 5:
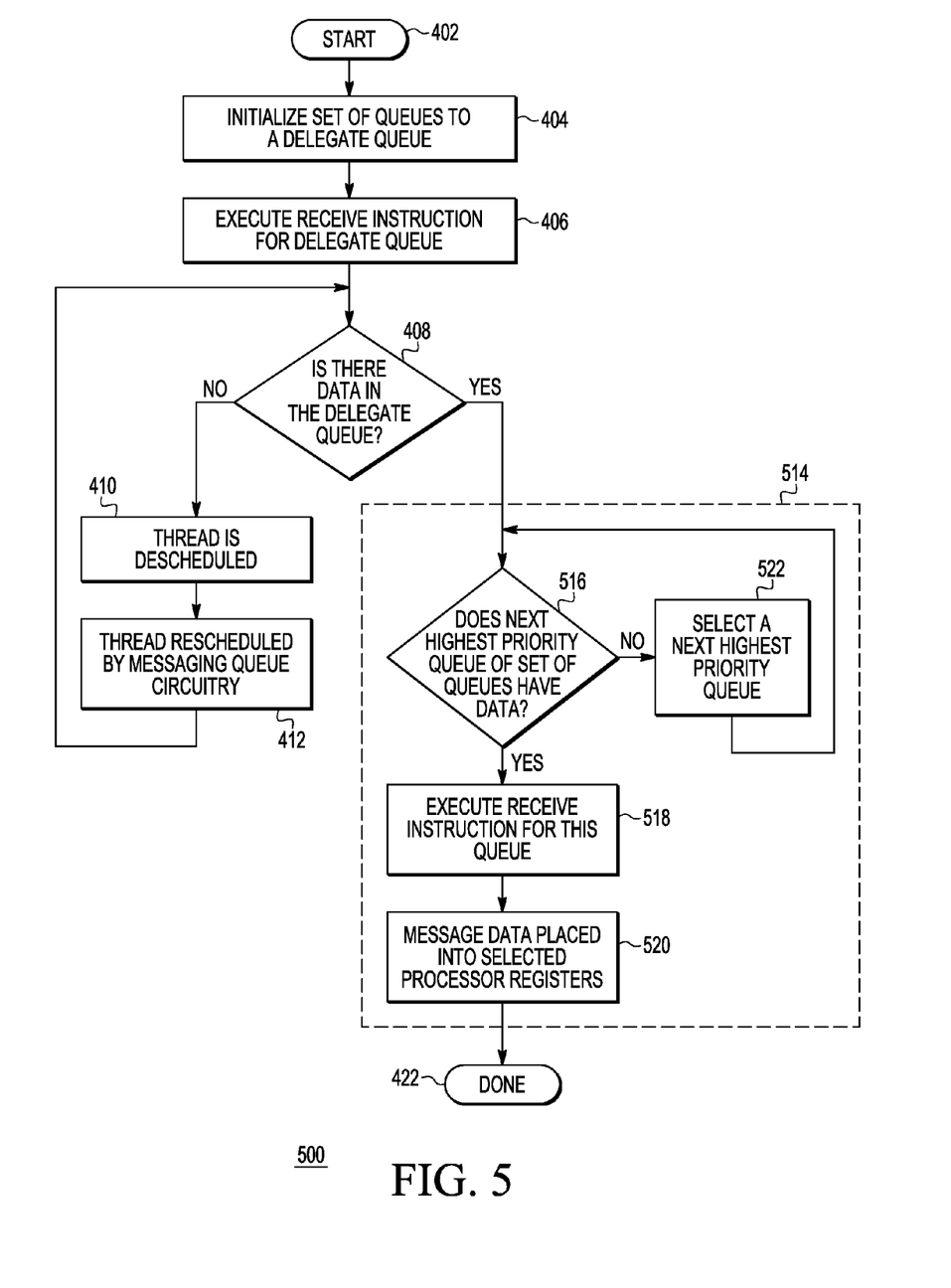
FIG. 5 illustrates, in flow diagram form, operations performed within messaging queue circuitry of a processing system element of the data processing system of FIG. 1 in accordance with one embodiment of the present invention.

FIGS. 4 and 5 illustrates various methods for a thread to receive messages through the use of a delegate queue. FIG. 4 illustrates a method 400 which begins with start 402 and proceeds to block 404 in which a thread executing on the processor, such as processor 208, initializes a set of queues to a delegate queue. The set of queues can include one or more of queues Q0-QN associated to the delegate queue. In one embodiment, the delegate queue is selected from queues Q0-QN. However, in an alternate embodiment, a separate set of queues can be used for delegate queues. In the example of FIG. 2, a thread of processor 208 initializes Q4 as a delegate queue and initializes set 218, including Q0-Q3, to correspond to delegate queue Q4. This includes storing the address of Q4 in each of DQA0-DQA3.

Method 400 proceeds to block 406 in which the thread executes a receive instruction for the delegate queue, which is Q4 in the example of FIG. 2. After block 406, it is determined, at decision diamond 408, whether there is any data stored in the delegate queue. If not, then method 400 proceeds to block 410 in which the thread is descheduled. That is, since there is no data in the delegate queue, it is known that no messages have been received at any of Q0-Q3. Therefore, after execution of the receive instruction for the delegate queue, the thread may sleep until a message has been received by any of Q0-Q3 (and thus a notification is received at the delegate queue). At some time later, when messaging queue circuitry 212 receives a message, messaging queue circuitry 212 reschedules the thread (in block 412). Note that, in one embodiment, the processor, such as processor 208, includes a thread scheduler which may determine when to switch threads, if the processor is a multi-threaded processor, or when to deschedule or reschedule a thread, such as based on information from queue control circuitry 216. Therefore, in between blocks 410 and 412, the thread scheduler may schedule a different thread or may put the processor to sleep.

After block 412, method 400 returns to decision diamond 408 to again determine whether there is data in the delegate queue. At decision diamond 408, if there is data in the delegate queue, method proceeds to section 414 of method 400, including blocks 416, 418, and 420, which completes transferring of a message to the processor. Therefore, note that upon receiving data (i.e. a notification) at the delegate queue, the thread is woken up since it is known that a message has been received by a messaging queue. If there is data in the delegate queue, the method proceeds to block 416, in which the address of the selected queue is read from the delegate queue and stored into a selected processor register (within the register file of the processor). In the example of FIG. 2, the address of the selected queue from the delegate queue is stored into a register of a register file within processor 208. Method 400 proceeds to block 418 in which the thread executes a receive instruction for the selected queue. Method 400 proceeds to block 420 in which the message data itself, read in response to the receive instruction for the selected queue, is placed into selected registers of the register file of the processor. In this manner, the contents of the selected registers of the processor of the sending processing system element have been transferred to selected registers of the processor of the receiving processing system. Method 400 then ends at done 422.

With the operations in section 414 of FIG. 4, a receive instruction is executed for the selected queue indicated by the notification (e.g. queue address) in the delegate queue. This may be the case in which, regardless of how many notifications are in the delegate queue, only the first notification is used to indicate the selected queue. As will be seen in FIG. 5, in an alternate embodiment, a thread can read all messaging queues to choose a highest priority queue. FIG. 5 illustrates a method 500 in which section 414 of FIG. 4 is replaced with section 514, which includes operations 516, 518, 520, and 522, which completes transferring of a message to the processor. At decision diamond 408, if there is data in the delegate queue, method 500 proceeds to decision diamond 516 in which it is determined whether a next highest priority queue of the set of queues corresponding to the delegate queue has data. For example, this may be determining a next highest priority queue of the queues in set 218 of FIG. 2. The next highest priority queue refers to the queue of the set of queues having the highest priority of those queues which have not yet been polled for data. If the next highest priority queue does not have data, method 500 proceeds to block 522 in which a next highest priority queue is selected. Again, this next highest priority queue is selected from the queues within the set of queues which have not yet been polled. Method 500 then returns to decision diamond 516.

At decision diamond 516, if the next highest priority queue of the set of queues does have data (i.e. does include a message stored within the queue), method 500 proceeds to block 518 in which the thread of the processor executes a receive instruction for that queue. Method 500 proceeds to block 520 in which the message data itself, read in response to the receive instruction for that highest priority queue, is placed into selected registers of the register file of the processor. In this manner, the contents of the selected registers of the processor of the sending processing system element have been transferred to selected registers of the processor of the receiving processing system. Method 500 then ends at done 422.

By now it should be apparent that embodiments of systems and methods disclosed herein provide for improved messaging in which a delegate queue can be indicated for a set of messaging queues. The delegate queue is configured to store one or more notifications of messages which have been received by the set of the messaging queues. In this manner, processors or threads within the data processing system may be awakened when it is known that a message is available in at least one of the set of messaging queues.

The terms "software" and "program," as used herein, are defined as a sequence of instructions designed for execution on a computer system. Software, a program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 1 and 2 and the discussion thereof describe an exemplary data processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 300, for example, from computer readable media such as memory or other media on other computer systems. Such computer readable media may be permanently, removably or remotely coupled to an information processing system such as system 300. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Embodiments disclosed here can be implemented in various types of computer processing systems such as a server or a personal computer system. Other embodiments may include different types of computer processing systems. Computer processing systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process. An operating system control operation of the CPU and main memory units as well as application programs.

As used herein, the term "bus" is a system interconnect and is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, indicator, status bit, or similar apparatus into its logically true or logically false state, respectively. If the logically true state is a logic level one, the logically false state is a logic level zero. And if the logically true state is a logic level zero, the logically false state is a logic level one.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an" The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

In one embodiment, a processing system includes a first processing system element; a second processing system element configured to communicate with the first processing system, wherein the second processing system element includes: a set of messaging queues, each of the messaging queues includes one or more entries for storing data; a set of delegate queue addresses, each of the set of delegate queue addresses is associated with one of the set of messaging queues; a delegate queue associated with the set of messaging queues, the delegate queue including a set of entries corresponding to the delegate queue addresses, and each of the entries of the delegate queue indicating whether a corresponding one of the set of messaging queues is storing data. In one aspect of the above embodiment, the second processing element further includes queue control circuitry configured to: receive a message from the first processing system element, wherein the message includes a queue address for one of the set of messaging queues, provide data associated with the message to the one of the set of messaging queues specified by the queue address, and add the queue address to the delegate queue to indicate the one of the set of messaging queues is storing data. In a further aspect, the queue control circuitry is further configured to: schedule a thread that is waiting for the data in response to the receive instruction being executed. In another aspect, the second processing element further includes a processor configured to, upon execution of a receive instruction for a delegate queue: determine whether there is data in the delegate queue; if there is data in the delegate queue, read the queue address from the delegate queue; and store the queue address in a processor register for subsequent use by other instructions. In yet a further aspect, the processor is further configured to: upon execution of the receive instruction for the delegate queue; if there is no data in the delegate queue, deschedule a thread associated with the receive instruction, and re-schedule the thread associated with the receive instruction when there is data in the delegate queue. In another aspect, the second processing element further includes a processor configured to: determine whether there is data in the delegate queue; if there is data in the delegate queue, determine whether a next highest priority messaging queue of the set of messaging queues has the data; if the data is in the next highest priority messaging queue, execute a receive instruction for the next highest priority messaging queue to transfer the data to the processor. In a further aspect, the processor is further configured to: select another next highest priority messaging queue of the set of messaging queues; determine whether there is data in the delegate queue; if there is data in the delegate queue, determine whether the other next highest priority messaging queue of the set of messaging queues has the data; if the data is in the other next highest priority messaging queue, execute a receive instruction for the other next highest priority messaging queue to transfer the data to the processor. In another further aspect, the processing system further includes a timer coupled to the queue control circuitry, wherein the queue control circuitry is configured to include a timeout indicator in the set of messaging queues.

In another embodiment, a processing system element includes a processor; messaging queue circuitry coupled to the processor, wherein the messaging queue circuitry includes: queue control circuitry; a plurality of messaging queues coupled to the queue control circuitry; a delegate queue associated with the plurality of messaging queues and coupled to the queue control circuitry; wherein the queue control circuitry is configured to: receive a message including a queue address; store the message in one of the plurality of messaging queues specified by the queue address; and store the queue address in the delegate queue. In one aspect, the queue control circuitry is further configured to: determine whether there is a delegate queue associated with the plurality of messaging queues before storing the queue address in the delegate queue. In another aspect, the queue control circuitry is further configured to: store the queue address in the delegate queue if the delegate queue is empty. In another aspect, the processing system element is further configured to: reschedule execution of a thread that is waiting for data in the message once the queue address is stored in the delegate queue. In another aspect, the processor is configured to: execute a receive instruction for the delegate queue; determine whether there is data in the delegate queue; if there is data in the delegate queue: read the queue address of the one of the plurality of messaging queues; and execute a receive instruction to transfer the message from the one of the plurality of messaging queues to the processor. In another aspect, the processor is configured to: execute a receive instruction for the delegate queue; determine whether there is data in the delegate queue; if there is data in the delegate queue: determine whether a next highest priority messaging queue of the plurality of messaging queues has the data; if the data is in the next highest priority messaging queue, execute a receive instruction for the next highest priority messaging queue to transfer the data to the processor.

In yet another embodiment, a method of passing messages between elements in a processing system includes associating a set of messaging queues with a delegate queue for each of the elements in the processing system; executing a receive instruction for the delegate queue for one of the elements; when there is data in the delegate queue for the one of the elements: executing a receive instruction for a selected one of the set of messaging queues for the one of the elements to transfer a message from the selected one of the set of messaging queues to the one of the elements based on the data in the delegate queue. In one aspect, the method further includes storing an address of the selected one of the set of messaging queues in the delegate queue for the one of the elements as the data. In another aspect, the method further includes when there is data for more than one of the set of messaging queues in the delegate queue for the one of the elements, choosing a highest priority one of the set of messaging queues as the selected one of the set of messaging queues. In another aspect, the method further includes, when there is no data in the delegate queue for the one of the elements: descheduling a thread being executed; rescheduling the thread when there is data in the delegate queue. In another aspect, the method includes, storing the message in the selected one of the messaging queues when the message is received. In another aspect, the method includes, receiving a message from another one of the elements in the one of the elements; storing the message in the selected one of the set of messaging queues for the one of the elements; and storing an address in the message in the delegate queue as the data, wherein the address identifies the one of the set of messaging queues for the one of the elements.

What is claimed is:

1. A processing system comprising:
   a first processing system element;
   a second processing system element configured to communicate with the first processing system element, wherein the second processing system element includes:
   a set of messaging queues, each of the messaging queues includes one or more entries for storing data;
   a set of delegate queue addresses, each of the set of delegate queue addresses is associated with one of the set of messaging queues;
   a delegate queue associated with the set of messaging queues, the delegate queue including a set of entries corresponding to the delegate queue addresses, and each of the entries of the delegate queue indicating whether a corresponding one of the set of messaging queues is storing data.

2. The processing system of claim 1, wherein the second processing element further comprises:
   queue control circuitry configured to:
   receive a message from the first processing system element, wherein the message includes a queue address for one of the set of messaging queues,
   provide data associated with the message to the one of the set of messaging queues specified by the queue address, and
   add the queue address to the delegate queue to indicate the one of the set of messaging queues is storing data.

3. The processing system of claim 2 wherein the queue control circuitry is further configured to:
   schedule a thread that is waiting for the data in response to a receive instruction being executed.

4. The processing system of claim 2, wherein the second processing element further comprises:
   a processor configured to, upon execution of a receive instruction for the delegate queue:
   determine whether there is data in the delegate queue;
   if there is data in the delegate queue,
      read the queue address from the delegate queue; and
      store the queue address in a processor register for subsequent use by other instructions.

5. The processing system of claim 4 wherein the processor is further configured to:
   upon execution of the receive instruction for the delegate queue;
   if there is no data in the delegate queue,
      deschedule a thread associated with the receive instruction, and
      re-schedule the thread associated with the receive instruction when there is data in the delegate queue.

6. The processing system of claim 2, wherein the second processing element further comprises:
   a processor configured to:
   determine whether there is data in the delegate queue;
   if there is data in the delegate queue,
      determine whether a next highest priority messaging queue of the set of messaging queues has the data;
      if the data is in the next highest priority messaging queue,
         execute a receive instruction for the next highest priority messaging queue to transfer the data to the processor.

7. The processing system of claim 6 wherein the processor is further configured to:
   select another next highest priority messaging queue of the set of messaging queues;
   determine whether there is data in the delegate queue;
   if there is data in the delegate queue,
      determine whether the other next highest priority messaging queue of the set of messaging queues has the data;
      if the data is in the other next highest priority messaging queue,
         execute a receive instruction for the other next highest priority messaging queue to transfer the data to the processor.

8. The processing system of claim 2, further comprising:
   a timer coupled to the queue control circuitry, wherein the queue control circuitry is configured to include a timeout indicator in the set of messaging queues.

9. A processing system element comprising:
   a processor;
   messaging queue circuitry coupled to the processor, wherein the messaging queue circuitry includes:
   queue control circuitry;
   a plurality of messaging queues coupled to the queue control circuitry;
   a delegate queue associated with the plurality of messaging queues and coupled to the queue control circuitry;
   wherein the queue control circuitry is configured to:
   receive a message including a queue address;
   store the message in one of the plurality of messaging queues specified by the queue address; and
   store the queue address in the delegate queue.

10. The processing system of claim 9, wherein the queue control circuitry is further configured to:
   determine whether there is a delegate queue associated with the plurality of messaging queues before storing the queue address in the delegate queue.

11. The system of claim 9 wherein the queue control circuitry is further configured to:
   store the queue address in the delegate queue if the delegate queue is empty.

12. The system of claim 9 wherein the processing system element is further configured to:
   reschedule execution of a thread that is waiting for data in the message once the queue address is stored in the delegate queue.

13. The system of claim 9 wherein the processor is configured to:
   execute a receive instruction for the delegate queue;
   determine whether there is data in the delegate queue;
   if there is data in the delegate queue:
      read the queue address of the one of the plurality of messaging queues; and
      execute a receive instruction to transfer the message from the one of the plurality of messaging queues to the processor.

14. The system of claim 9 wherein the processor is configured to:
   execute a receive instruction for the delegate queue;
   determine whether there is data in the delegate queue;
   if there is data in the delegate queue:
      determine whether a next highest priority messaging queue of the plurality of messaging queues has the data;
      if the data is in the next highest priority messaging queue,
         execute a second receive instruction for the next highest priority messaging queue to transfer the data to the processor.

15. A method of passing messages between elements in a processing system comprising:
   associating a set of messaging queues with a delegate queue for each of the elements in the processing system;
   executing a receive instruction for the delegate queue for one of the elements;
   when there is data in the delegate queue for the one of the elements:
      executing a second receive instruction for a selected one of the set of messaging queues for the one of the elements to transfer a message from the selected one of the set of messaging queues to the one of the elements based on the data in the delegate queue.

16. The method of claim 15 further comprising:
   storing an address of the selected one of the set of messaging queues in the delegate queue for the one of the elements as the data.

17. The method of claim 15 further comprising:
   when there is data for more than one of the set of messaging queues in the delegate queue for the one of the elements, choosing a highest priority one of the set of messaging queues as the selected one of the set of messaging queues.

18. The method of claim 15 further comprising:
   when there is no data in the delegate queue for the one of the elements:
      descheduling a thread being executed;
      rescheduling the thread when there is data in the delegate queue.

19. The method of claim 15 further comprising:
   storing the message in the selected one of the messaging queues when the message is received.

20. The method of claim 15 further comprising:
   receiving a message from another one of the elements in the one of the elements;
   storing the message in the selected one of the set of messaging queues for the one of the elements; and
   storing an address in the message in the delegate queue as the data, wherein the address identifies the one of the set of messaging queues for the one of the elements.

* * * * *